Jan. 30, 1940.     W. J. CHIEVITZ     2,188,855
OIL SEAL
Filed Oct. 18, 1937
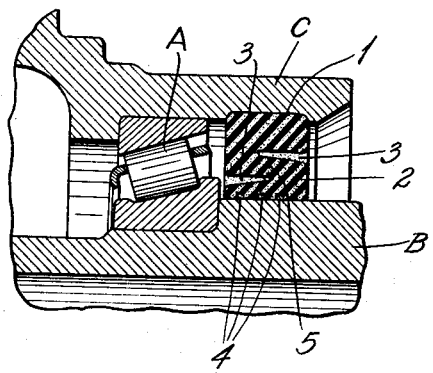
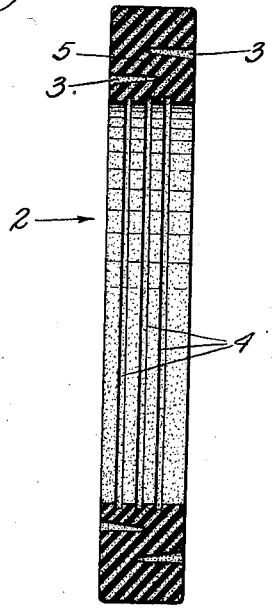
INVENTOR:
William J. Chievitz
HIS ATTORNEYS Patented Jan. 30, 1940

2,188,855

UNITED STATES PATENT OFFICE 2,188,855

OIL SEAL

William J. Chievitz, Canton, Ohio, assignor to The Timken Roller Bearing Company, Canton, Ohio, a corporation of Ohio Application October 18, 1937, Serial No. 169,555

3 Claims. (Cl. 288—19)

This invention relates to devices for preventing the escape of oil or grease from bearings. The principal object of the present invention is to devise a seal of simple construction which will be easy to mount and replace, which will be efficient in operation, which will not require as accurate machining of associated parts as has heretofore been usual, which will be resistant to heat, acid, water, grit and dirt, and which will be flexible throughout a wide range of temperature. The invention consists in the device and in the combinations and arrangements of parts hereinafter described and claimed.

In the accompanying drawing, wherein like reference numerals refer to like parts wherever they occur, Fig. 1 is a longitudinal sectional view of a sealing ring embodying my invention shown in connection with a bearing interposed between relatively rotatable inner and outer members; and Fig. 2 is a central longitudinal section through the sealing ring shown in Fig. 1.

In the construction shown in Fig. 1, A represents a taper roller bearing interposed between relatively rotatable inner and outer members B and C, respectively.

According to the present invention, a wide groove 1 is formed in the bore of the outer member C beyond the bearing A. In this groove is mounted a sealing ring 2 of elastic material whose normal diameter, namely, the diameter thereof when not under stress, is greater than the diameter of said groove. Consequently, the ring 2 must be compressed radially in order to reach its seat in the groove. When seated in the groove, the ring 2 is still under radial compression and fastens itself in the outer member C by frictional engagement with the bottom of the groove 1. In the unstressed condition of the ring, its entire inner surface is of smaller diameter than the outer diameter of the inner member B around which it slides.

The sealing ring 2 of Fig. 1 is thick longitudinally and of considerable radial width between its inner and outer surfaces. It is provided in its opposite end faces with deep annular grooves 3 that are spaced apart radially, one of said grooves being adjacent to the outer periphery and the other being adjacent to the inner periphery, and the inner portions of the grooves overlapping or extending past each other so that, in cross-section, the ring is Z-shape. Shallow grooves 4 are formed in the inner surface to enable it to better adapt itself to the surface of the inner member B.

By the arrangement described, the ring 2 is mounted in the groove 1 in the outer member C by merely compressing the ring radially and forcing it endwise in the bore of the outer member until it reaches the groove 1 and seats itself automatically therein by expanding part way back to its unsprung condition; and, in like manner, the ring is slipped over the inner member B, its inner diameter being stretched sufficiently for the purpose.

It is noted that the deep grooving or Z-shape section of the ring 2 enables the ring to accommodate itself with great facility to the parts with which it is associated in practice. For instance, when the ring 2 is pulled onto the inner member B, its inner peripheral portion is stretched circumferentially and the side walls of the grooves 3 are bent or folded towards each other about the bottom walls of the grooves, the force required for such stretching and bending being much less than would be necessary to compress a solid ring of the same material to the same extent. Thus, the ring may not only be made with an outside diameter enough larger than its seat to insure the requisite frictional engagement therewith, but it may also be so made that its inner surface will make a sliding oil tight engagement with the inner member B without creating any substantial frictional resistance to the rotation of either the inner or outer member. The ring 2 can adjust itself automatically to eccentricity by bending or springing the relatively narrow and oblique web 5 of material between the two grooves 3.

The material which I contemplate using for making the elastic ring of Fig. 1 is a treated rubber or synthetic rubber such as those known under the commercial names of Thiokol and Neoprene. These materials are not only elastic but are resistant to the heat generated by the sealing device and to the heat to which such device is exposed in service, and they are resistant to acid, water, grit and dirt, and they maintain their flexibility and elasticity throughout the range of temperature occurring in service.

It is a great advantage of the ring 2 of Fig. 1 that it is of very simple construction, made of a single piece, easy to apply and makes a good fit throughout a considerable range of sizes of the parts with which it is associated.

My invention is applicable to bearings generally. Obviously also the parts may be so designed that the device will be held fast frictionally to either the inner or outer member, as desired.

What I claim is:

1. The combination with two members having concentric surfaces, one of said members being rotatable, of a sealing device therefor, said device consisting of a thick and radially wide ring of elastic material which has an annular groove in the bore thereof and annular grooves in its opposite faces at different distances from the axis of the ring and with their inner end portions overlapping, the outer portion of the ring being contracted beyond its unstressed diameter and held to the outer member by frictional engagement therewith and the inner portion of the ring being expanded beyond its unstressed diameter and making a sliding contact with the inner member, and the portion of the ring radially between said face grooves being free to flex transversely of said face grooves to afford freedom for limited relative movement of the inner and outer portions of the ring.

2. A one piece oil seal consisting of a relatively thick sealing ring of elastic material having deep anular grooves in its opposite faces at different distances from its axis whereby the radial dimension of the material may be decreased without excessive compression thereof.

3. A one piece oil seal consisting of a relatively thick sealing ring of elastic material having annular grooves in its opposite faces at different distances from its axis and with their bottom portions overlapping in the axial direction whereby the portions of the material opposite the bottoms of the grooves are enabled to bend so as to narrow the radial width of the material without excessive compression thereof.

WILLIAM J. CHIEVITZ.